(12) United States Patent
Tondorf et al.

(10) Patent No.: US 7,134,177 B2
(45) Date of Patent: Nov. 14, 2006

(54) METHOD AND DEVICE FOR APPLYING A SCALE OR SCALE SUPPORT

(75) Inventors: Sebastian Tondorf, Waging am See (DE); Peter Pechak, Stein/Truan (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 263 days.

(21) Appl. No.: 10/359,010

(22) Filed: Feb. 5, 2003

(65) Prior Publication Data

US 2003/0172515 A1  Sep. 18, 2003

(30) Foreign Application Priority Data

Feb. 5, 2002 (DE) ................. 102 04 611

(51) Int. Cl.
*B23Q 3/00* (2006.01)
*B23Q 17/22* (2006.01)
(52) U.S. Cl. ............... 29/464; 33/710; 33/706; 29/466; 29/468
(58) Field of Classification Search ........... 29/464, 29/466, 468; 33/701, 702, 703, 706, 707, 33/710
See application file for complete search history.

(56) References Cited

U.S. PATENT DOCUMENTS

| | | | | |
|---|---|---|---|---|
| 3,816,002 A * | 6/1974 | Wieg | ............. | 356/395 |
| 4,437,400 A * | 3/1984 | Ellis | ............. | 101/18 |
| 4,567,663 A * | 2/1986 | Gillespie | ............. | 33/501.6 |
| 4,936,023 A * | 6/1990 | Pechak | ............. | 33/706 |
| 5,063,685 A | 11/1991 | Morrison et al. | | |
| 5,092,058 A * | 3/1992 | Luttmer et al. | ............. | 33/706 |
| 5,258,931 A * | 11/1993 | Hassler, Jr. | ............. | 702/105 |
| 5,687,489 A * | 11/1997 | Tondorf et al. | ............. | 33/706 |
| 5,924,214 A * | 7/1999 | Boege et al. | ............. | 33/706 |
| 5,987,768 A * | 11/1999 | Freitag et al. | ............. | 33/706 |
| 6,049,992 A | 4/2000 | Freitag et al. | | |
| 6,105,271 A * | 8/2000 | Freitag et al. | ............. | 33/706 |
| 6,349,481 B1 | 2/2002 | Nelle | | |
| 6,433,875 B1 * | 8/2002 | Kovac | ............. | 356/498 |
| 6,571,486 B1 * | 6/2003 | Tondorf et al. | ............. | 33/706 |
| 6,578,283 B1 * | 6/2003 | Nishi | ............. | 33/706 |
| 6,612,047 B1 * | 9/2003 | Mazgaj et al. | ............. | 33/706 |
| 6,729,036 B1 * | 5/2004 | Denzel et al. | ............. | 33/706 |
| 6,772,531 B1 * | 8/2004 | Henshaw et al. | ............. | 33/706 |
| 6,865,820 B1 * | 3/2005 | Burgschat et al. | ............. | 33/706 |
| 6,904,696 B1 * | 6/2005 | Boge et al. | ............. | 33/706 |
| 2003/0154616 A1 * | 8/2003 | Mazgaj et al. | ............. | 33/706 |
| 2003/0159305 A1 * | 8/2003 | Wahl et al. | ............. | 33/707 |
| 2004/0154180 A1 * | 8/2004 | Burgschat et al. | ............. | 33/706 |
| 2004/0154181 A1 * | 8/2004 | Nakamura et al. | ............. | 33/706 |
| 2005/0108888 A1 * | 5/2005 | Burgschat et al. | ............. | 33/706 |
| 2006/0016089 A1 * | 1/2006 | Kawada et al. | ............. | 33/706 |

FOREIGN PATENT DOCUMENTS

| | | |
|---|---|---|
| DE | 197 00 367 A1 | 7/1998 |
| DE | 199 14 311 A1 | 10/2000 |
| EP | 0 388 453 B1 | 6/1993 |

* cited by examiner

*Primary Examiner*—Essama Omgba
(74) *Attorney, Agent, or Firm*—Brinks Hofer Gilson & Lione

(57) ABSTRACT

A device for applying a scale element to a first body, in relation to which a second body can be moved in a measuring direction, the device includes an alignment element displaceable on a scale element in a measuring direction, and applied transversely thereto in a defined position, and includes a reference surface, which is adapted for interaction with a second reference surface on a second body and otherwise is loose in relation to the second body.

16 Claims, 1 Drawing Sheet

METHOD AND DEVICE FOR APPLYING A SCALE OR SCALE SUPPORT

Applicants claim, under 35 U.S.C. § 119, the benefit of priority of the filing date of Feb. 5, 2002 of a German patent application, copy attached, Serial Number 102 04 61 1.5, filed on the aforementioned date, the entire contents of which is incorporated herein by reference.

BACKGROUND OF THE INVENTION

1. Field of the Invention

The present invention relates to a method for applying a scale or scale support on a first body, in relation to which a second body can be moved in the measuring direction. The present invention also relates to a device for executing the method.

2. Discussion of Related Art

Comparatively long scales are often employed for position measuring on machine tools or coordinate measuring devices. Such scales must be fastened with high accuracy and aligned parallel with respect to a measuring direction. In this case the measuring direction is determined by the guide device of the respective machine. In connection with this, because of unavoidable inaccuracies in particular, the guide of the respective machine can cause a movement of the movable portion of the machine which is not exactly straight. To assure even in such a case a precise measurement between a first body of the machine and a second body of the machine which is movable in relation to the first body, it is necessary to attach the scale as exactly as possible in such a way that it imitates the actual movement of the second body. In other words, the scale must be attached in such a way that any deviations from a straight line which the second body performs in the course of its movements must be reflected as accurately as possible.

An applicator is known from EP 0 388 453 B1, by which a self-adhesive tape scale can be glued on. The applicator can be affixed to the second body, which is movable with respect to the first body, so that an orientation with respect to the actual movement of the second body, for example a carriage of a machine tool or measuring device, can take place. This known device has the disadvantage that on the one hand it is only suitable for highly-resilient scales in a tape form, and on the other hand an automated application of the scale is only possible by comparatively complicated ways.

DE 197 00 367 A1 describes the application of lateral contact elements along the length of the measuring tape, against which the measuring tape is placed and to which it can be fastened, aligned in this way.

A method and a device are known from DE 199 14 311 A1. This method and the associated device are also suitable for comparatively inherently stable scales or scale supports or scale holders, in that several spacers maintain the measuring tape at a distance from the application surface, and an alignment of the scale or the scale supports takes place in this position. Afterwards the support of the scale or of the scale support is removed, so that the adhesive layer can come into action.

OBJECT AND SUMMARY OF THE INVENTION

An object of the present invention is based on creating a method and a device for applying a scale or scale support to a body, which is comparatively simple and allows an exactly aligned application of a scale or a scale support.

For one, this object is attained by a method for applying a scale element on a first body, in relation to which a second body can be moved in a measuring direction. The method includes (a) applying an alignment element, which is displaceable on a scale element in a measuring direction, and which is guided on the scale element in a defined position transversely to the measuring direction and (b) placing a reference surface of the alignment element against a reference surface of a second body. The method further includes (c) fastening the scale element at least as far as a vicinity of the alignment element, (d) moving the alignment element ahead in the measuring direction and repeating steps (b)–(d).

In accordance therewith, a single alignment element is used for applying a scale or a scale support on a first body, in relation to which a second body can be moved in a measuring direction. The alignment element can be displaced on the scale or the scale support in the measuring direction, and can be placed transversely thereto in a defined position, and in particular is guided free of play transversely in relation to the measuring direction on the scale or the scale support. By this it is possible to assure in an advantageous manner during the alignment process, that the scale or the scale support exactly follows every alignment movement of the alignment element transversely to the measuring direction. The alignment element has at least one reference surface which is adapted for operating together with a reference surface on the second body. Otherwise the alignment element is loose with respect to the movable second body.

Within the framework of the method of the present invention, starting at one end of the scale or of the scale support the reference surface of the alignment element is initially placed against the reference surface of the second body. With this, an exact arrangement of the scale or the scale support takes place by very simple devices at the location at which the alignment element happens to be. A first end of the scale or of the scale support is fastened at the start of the application process. At a suitable distance from the end, for example approximately 400 mm, an exact alignment at this location takes place by the placement of the reference surface of the alignment element against the reference surface of the movable body. Due to the fact that thereafter the scale or the scale support is fastened at least as far as close to the vicinity of the alignment element, the entire area between the start of the scale or of the scale support and the fastened area is exactly aligned with respect to the movable second body. The location up to which the scale or the scale support can be fastened is a function of the exact design of the alignment element, and possibly of the spacer element, which will be described later. It is preferred that the scale or the scale carrier be fastened at least up to the location where the alignment element is located and aligned relative to the reference surface of the second moved body. The exact alignment is particularly dependably assured at this location. In connection with defined embodiments, for example if an alignment element is used which creates a distance between a self-adhesive layer and the application face, the scale or the scale support is fastened as closely as possible to the location of the alignment element.

Thereafter the alignment element is again moved forward in the measuring direction and the previously described steps, namely placement against the reference surface of the second body and fastening, are repeated. By this it is possible to fasten a scale or a scale body step-by-step, so to speak, exactly aligned on the first body. In particular, a scale in the shape of a comparatively thin steel tape, as well as a scale or a scale support in the form of a profiled aluminum element, can be applied exactly aligned in the described manner. If, for example, the placement of the alignment element at a defined location requires a bending of the scale or of the scale support around an axis extending vertically with respect to the surface, a correct application can be performed from the last fastened location and the location which is aligned in relation to the respective second body. This method is repeated until the end of the scale or of the scale holder has been reached.

The method of the present invention makes possible a particularly simple application of a scale or of a scale holder, because the required aids are simply designed and simple to handle. It is merely necessary to place the alignment element in a defined position transversely to the measuring direction against the scale of the scale holder, for example by a placement edge. Otherwise it is displaceable with respect to it and can otherwise remain loose. By a reference surface, which preferably is comparatively short in the measuring direction, an appropriate reference surface of the alignment element can be placed against the movable second body. The correct positioning of the scale or of the scale support can be easily verified by a visual check of the required placement against the reference surface, so that a scale or a scale support can be fastened, correctly aligned in a simple manner, by the method of the present invention.

The method of the present invention is advantageous in that it is suitable for scales and for scale supports which can be glued or screwed in place. Moreover, any arbitrary reference surface can be provided on the moved second body, i.e. a movable portion of a machine. This is in particular advantageous if it is necessary to fix the scale or the scale support on the machine at a time at which the actual face to which the scanning head is screwed is not yet available. Within the framework of the present invention it is possible here to use any arbitrary reference surface on the moved machine element.

It can be provided in connection with the scale or the scale support that it has a self-adhesive layer. So that in this case the scale or the scale support are only fastened on the body when it has been appropriately aligned, a spacer element is preferably provided by the method of the present invention, which maintains the scale or the scale support at a distance away from the application surface as long as the scale or the scale support have not yet been correctly aligned. Within the framework of the method of the present invention, the spacer element is moved toward the reference surface of the second body prior to applying the alignment element, and a covering, which is preferably provided over the adhesive layer, is removed to a large extent as far as to the spacer element. In particular, in this case the covering is removed up to an area extending past the location of the alignment element. In this way the scale or the scale support can be fastened in an advantageous manner up to the location of the alignment element at which the correct alignment is assured. The self-adhesive layer basically becomes effective by the removal of the covering, wherein the spacer prevents the scale or the scale support from being already fastened on the body. Instead, to this end the alignment element must be moved forward and placed against the reference surface of the second body, so that then the scale or the scale support can be applied in a correctly aligned position.

In certain applications it can be provided for the scale or the scale support to be fastened by screws to the first body. In this case the above described spacer element is not necessarily required, instead, the alignment element itself can provide that the scale or the scale carrier are fastened step-by-step, in correct alignment. Thus, starting at one end of the scale or the scale support, the alignment element is moved in an advantageous manner up to shortly back of a fastening opening for a screw. After the application of the alignment element, fastening is performed by the respective screw, so that the scale is fastened, correctly aligned, as far as the screw connection.

The object on which the present invention is based is attained by a device for applying a scale element to a first body, in relation to which a second body can be moved in a measuring direction, the device includes an alignment element displaceable on a scale element in a measuring direction, and applied transversely thereto in a defined position, and includes a reference surface, which is adapted for interaction with a second reference surface on a second body and otherwise is loose in relation to the second body.

Accordingly, the device in accordance with the present invention has a single alignment element with the above described properties. The alignment element itself can be designed to be extremely simple and it can be manipulated comparatively easily, so that a cost-effective, simple and, at the same time exactly aligned application of a scale or a scale support is possible.

In order to prevent errors in the orientation of the alignment element with respect to the movable second body as dependably as possible, the reference surface of the alignment element is comparatively short in the measuring direction. It preferably is 5 mm or less. Because of this short design of the reference surface it is possible to orient and, if required, rotate the alignment element in the necessary way with respect to the movable second body, so that all deviations from the actual course of movement of the second body can be copied as exactly as possible to the course of the scale or of the scale support. In this connection the formation of a slight convex curve in the measuring direction has proven to be advantageous. This causes a contact which is point- or line-like to a large degree, and therefore a particularly exact alignment.

For aligning the at least one reference surface of the alignment element, an arrangement thereof on at least one of the sides of the alignment element and/or the top, viewed in the measuring direction, has been shown to be advantageous. By these variations it is possible to take all embodiments with respect to the second movable body into account.

To keep the danger of deviations in the course of the alignment of the scale or of the scale support as low as possible, it is preferred that the alignment element, which advantageously is guided free of play on the scale, can be immovably clamped in the measuring direction with respect to the scale or to the scale support. By this it is possible to fix the alignment element in relation to the scale or to the scale support at least briefly in place at those locations, where an alignment with respect to the movable second body is to be performed, so that there is only an extremely slight danger that the fastening of the scale or of the scale support is changed by unintentional movement of the alignment element on the scale or on the scale support.

A spacer element, by which the scale or the scale support can be kept at a distance from the surface of the first body, has been shown to be advantageous for the device in accordance with the present invention, in particular in connection with the application of scales or of scale supports having a self-adhesive layer. In accordance with the present invention it is possible in particular to provide a single such spacer element, so that the device remains simple even in this embodiment. The spacer element can be displaced in the measuring direction in relation to the scale or to the scale support, so that it can be moved forward step-by-step along the scale or the scale support. It is thereafter possible to remove the covering, for example as far as close to the spacer element, without there being a danger that the scale or the scale support inadvertently adheres to the first body.

Approximately 1 mm has been shown to be advantageous for the distance formed between the scale or the scale support and the attachment surface by the spacer element. In this case the spacer element has a thickness of approximately 1 mm between the scale or the scale support and the underside of the spacer element in the attached state of the scale or the scale support.

A particularly simple design of the device of the present invention results if the spacer element has been integrated into the alignment element. In other words, the alignment element is not only adapted for resting against the scale or the scale support in a defined position transversely to the measuring direction and for being placed with its reference surface against the reference surface of the second movable body, but furthermore it can maintain the scale or the scale support to be applied at a distance from the application surface. This embodiment is particularly effective for scales in the form of comparatively thin tapes, in particular steel tapes, since in this case the alignment and spacer element can be designed to be extremely simple, while at the same time providing all required functions. In this connection it is particularly preferred that the area of the combined alignment and spacer element which provides the distance from the application surface, is spaced apart in the measuring direction from the reference surface of the alignment element. The area which provides the distance can be located ahead of the reference surface in the direction of successive applications, so that a self-adhesive layer can be dependably removed up to the location of the reference surface, and the scale or the scale support can be fastened up to this location, which is exactly aligned.

Regarding the spacer element it should be additionally noted that the latter can also be used as an assembly aid without the alignment element, if the scale or the scale support are fixed on contact elements, for example pins or an edge of the application face. In this case the spacer element shows, in combination with any arbitrary method or any arbitrary device, its advantages even without the alignment element in that the scale or the scale support are maintained at a safe distance from the application face and a covering can be removed from the self-adhesive layer, for example, as far as up to the spacer element. In this case the spacer element indicates in an advantageous manner the location up to which the covering can be removed.

Further advantages, as well as details of the present invention ensue from the subsequent description of exemplary embodiments by the attached drawings.

DETAILED DESCRIPTION OF THE PREFERRED EMBODIMENTS

Figure 1:
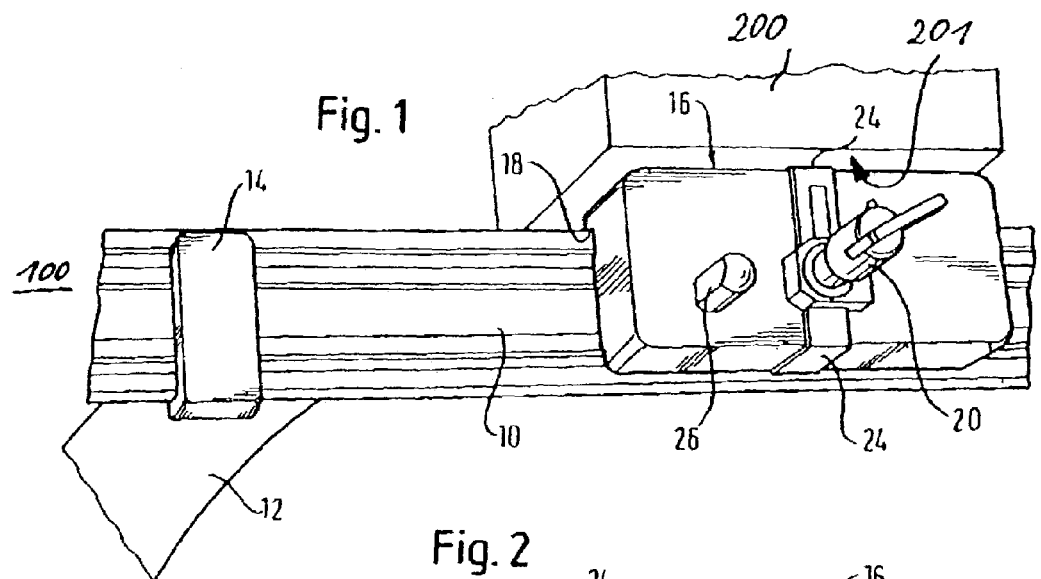
FIG. 1 represents a first embodiment of a device in accordance with the present invention showing a portion of an embodiment of a scale support in accordance with the present invention.

A portion of a scale element, such as scale support 10 in the form of a profiled aluminum strip, is represented in a perspective plan view in FIG. 1. In the embodiment shown, a self-adhesive layer, which is covered with a covering strip 12, is provided on the underside (not represented in the drawing figure) of the scale support 10. The embodiment of the device in accordance with the present invention represented has, for one, a spacer element 14, which is substantially designed in a U-shape and extends from one side around the scale support 10. The spacer element 14 is movable in the measuring direction, i.e. in the linear direction of the scale support 10, and its underside is of a defined thickness. By this the scale support 10 is dependably spaced apart from its application face in an area up to the location where the spacer element 14 is arranged. It is possible in particular to remove the covering strip 12 from the self-adhesive face as far as up to the vicinity of the spacer element 14 without there being the danger that the self-adhesive underside of the scale support 10 comes inadvertently into contact with the application face.

This contact and the fastening of the scale support 10 on a body 100 is to be performed only after a correct alignment of the scale support 10 in relation to a movable second body 200 has been provided by the alignment element 16, represented on the right in FIG. 1. By a suitable reference surface, in particular an edge 18 (which can be seen in FIG. 2), the alignment element 16 can be aligned in relation to the scale support 10 in a direction vertically with respect to the measuring direction. But otherwise the alignment element 16 can be moved in the measuring direction, i.e. in the direction of the extension of the scale support 10, with respect to the latter.

However, a clamping mechanism is provided in the embodiment shown, which can provide a fixation in place of the alignment element 16 in relation to the scale support 10. In the illustrated case, the clamping mechanism has a clamping lever 20 by which an oval plate 22 provided on the underside (see FIG. 2) can be rotated in such a way that it spreads, so to speak, between two, projecting sections, extending parallel to each other, of the scale support 10 and fixes the alignment element 16 in place, at least temporarily. In this fixed position it is possible to bring the alignment element 16 into contact with the movable second body 200, for example the carriage of a machine tool or measuring machine, by the interaction of one of its reference surfaces and a reference surface 201 of the latter.

Contact position means a position in which the scale support 10 is appropriately aligned with respect to the actual movement of the carriage, so that an exact matching between the movement of the carriage and the course of the scale support 10, and therefore of the scale, exists if the scale support 10 is fixed in place in this position. The comparatively inherently stiff scale support 10 can also be pressed against the application face of the first body 100 and fastened as far as the location of the alignment element 16. In the embodiment of the alignment element illustrated it can be seen that, with respect to the measuring direction, it has reference surfaces 24 on both sides and a reference surface 26 on the top. By this an appropriate positioning of the alignment element 16 in relation to the moved body, and therefore a correct alignment of the scale support 10, can take place for all constellations of a movable body 200, for example a carriage having a scanning head which interacts with the scale during the measuring operation. It should be noted that during the above described alignment and application process the scanning head customarily is not, or not yet, fastened on the movable body 200.

However, in an alternative manner the alignment process can also be performed in a state wherein the scanning head has already been installed. In this case the reference surface 201 of the movable second body 200 can be embodied on the scanning head itself.

Within the framework of the method of the present invention, the spacer element 14 is initially pushed by preferably approximately 100 mm on the scale support 10. The alignment element 16 is fixed in place at the start of the scale support 10 by the clamping mechanism 20. Subsequently, the covering strip 12 can be pulled off as far as up to spacer element 14. Thereafter the scale support 10 is pushed against the reference surface 201 of the movable second body 200 with the aid of the alignment element, so that the self-adhesive layer provides its adhesive effect. The scale support 10 cannot be glued completely as far as the spacer element 14 because of its inherent stiffness.

In the next step, first the spacer element 14 is preferably pushed forward by about 400 mm, and the cover strip 12 is removed as far as the vicinity of the spacer element 14. The alignment element 16 is first loosened by releasing the clamping mechanism 20, and is preferably displaced as far as approximately 100 mm ahead of the spacer element 14 and again fixed in place. The reference surface on the moved second body 200 is also moved ahead. In the case of a carriage of a machine tool or measuring machine, the latter is moved along its guide. By this the reference surface 201 of the second body 200 reaches a position in which the scanning head is located during operation. Thus, the scale support 10 is aligned exactly in accordance with the actual movement of the scanning head by placing the alignment element 16 against the reference surface 201 of the moved second body 200, and it can thereafter be pressed on and fastened through the effects of the self-adhesive layer. These steps are repeated until the end of the scale support 10 has been reached.

In the case of a scale support which is fastened by screws, the alignment element 16 and the reference surface of the moved second body 200 are each displaced into the vicinity of an opening provided for a screw. The screw can be tightened in the state where the alignment element is placed against the reference surface of the moved second body 200.

Figure 2:
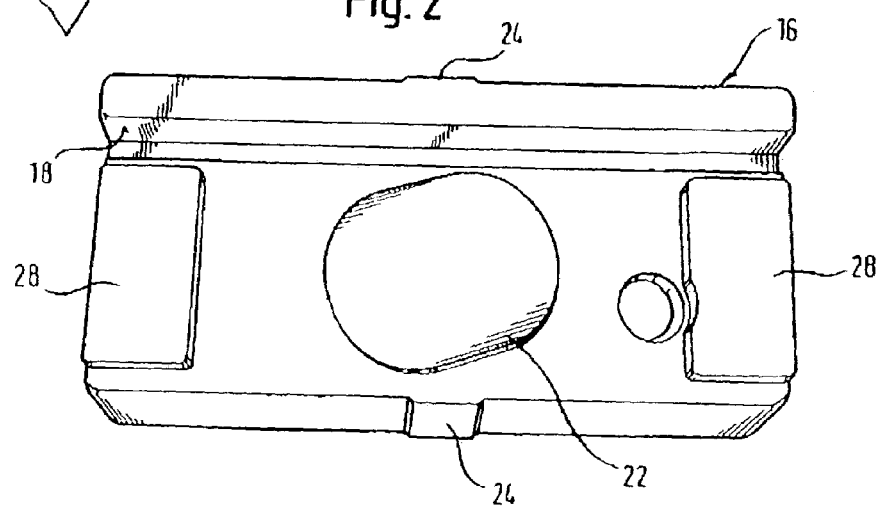
FIG. 2 shows the underside of an embodiment of an alignment element to be used with the device of FIG. 1 in accordance with the present invention.

The underside of the alignment element 16 is additionally represented in FIG. 2. The definite positioning in relation to the scale support 10 in a direction vertically to its linear extension is provided by the mentioned edge 18. An alignment in relation to a lateral reference surface of the moved second body can take place by the visible lateral reference surfaces 24. With the embodiment represented, substantially rectangular raised sections 28 at the front and rear end of the represented alignment element 16 provide guidance between corresponding substantially strip-like sections on the top of the scale support 10.

Figure 3:
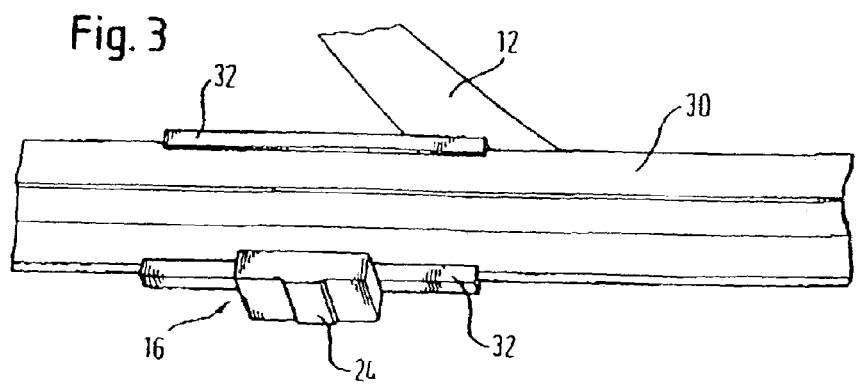
FIG. 3 represents a second embodiment of a device in accordance with the present invention showing a portion of an embodiment of a scale in accordance with the present invention.

An embodiment of the device in accordance with the present invention is represented in FIG. 3, wherein the spacer element is integrated in the alignment element. In this case the alignment element 16 extends around the underside of a scale element, such as scale 30, which in this case is embodied as a comparatively thin steel tape of a thickness of approximately 0.3 mm. Sections 32 also extend around the lateral edge areas of the scale 30, wherein reference surfaces with respect to the measuring tape 30 are formed on the inside of the enclosing sections 32. In the exemplary embodiment shown, a reference surface 24 for alignment on the reference surface of a moved second body is provided on the side. Since the alignment element 16 has a certain thickness on the underside (not visible), a spacer element is formed by this at the same time.

Within the framework of the method of the present invention, the alignment element 16 is initially arranged at the start of the scale 30, and the cover strip 12 is pulled off as far as the vicinity of the alignment element 16. The reference surface 24 of the alignment element 16 is placed against the corresponding reference surface 201 of the moved second body 200, and the scale 30 is pressed on the application surface, so that the self-adhesive layer comes into effect.

Thereafter, the alignment element is preferably moved ahead by approximately 200 mm, and the cover strip 12 is pulled off. The reference surface 201 on the moved second body 200 is also moved ahead. In the case of a carriage of a machine tool or a measuring machine, the latter is correspondingly moved ahead. Finally, the displaced alignment element 16 is placed and pressed against the displaced reference surface of the movable second body 200, and the scale 30 is pressed against the application face up to the area of the alignment element 16 and is fastened in this way. A particularly exact linear measurement can be performed during operations in that the position of the scale 30 in relation to the actual movement of the moved second body 200, and therefore of a scanning head fixed thereon, is aligned in steps.

Further exemplary embodiments exist within the scope of the invention besides the described examples.

We claim:

1. A method for applying a scale element on a first body, in relation to which a second body can be moved in a measuring direction, the method comprising:
   (a) applying an alignment element, which is displaceable on a scale element in a measuring direction and which is guided on said scale element in a defined position transversely to said measuring direction;
   (b) placing a reference surface of said alignment element against a reference surface of a movable second body;
   (c) fastening said scale element on a first body at least as far as a vicinity of said alignment element; and
   (d) moving said alignment element ahead in said measuring direction independent of movement by said second body, wherein said second body is movable in said measuring direction in relation to said first body; and
   repeating steps (b)–(d).

2. The method of claim 1, wherein said scale element comprises a scale.

3. The method of claim 1, wherein said scale element comprises a stiff scale support.

4. The method of claim 1, further comprising:
   providing a spacer element, which can be displaced with respect to said scale element in said measuring direction; and
   performing the following steps prior to said placing said reference surface of said alignment element:
      moving forward said spacer element along said measuring direction relative to said scale element; and
      removing a covering from a self-adhesive layer on said scale element.

5. The method of claim 1, wherein said fastening comprises applying an adhesive bonding to said scale element.

6. The method of claim 1, wherein said placing said reference surface is begun at one end of said scale element.

7. A device for applying a scale element to a first body, in relation to which a second body can be moved in a measuring direction, the device comprising:

an alignment element displaceable on a scale element in a measuring direction, and applied transversely thereto in a defined position, said scale element adapted to be fastened to a first body, wherein said alignment element comprises a first reference surface, which is adapted for interaction with a second reference surface on a movable second body and otherwise is loose in relation to said second body, said first reference surface adapted to be placed against said second reference surface, and wherein said alignment element is displaceable along said measuring direction independent of movement by said second body, said second body movable in said measuring direction in relation to said first body.

8. The device of claim 7, wherein said scale element comprises a scale.

9. The device of claim 7, wherein said scale element comprises a stiff scale support.

10. The device of claim 7, wherein said first reference surface of said alignment element is approximately 5 mm long or shorter in said measuring direction.

11. The device of claim 7, wherein said first reference surface is provided on at least one side of said alignment element as viewed in said measuring direction.

12. The device of claim 7, wherein said first reference surface is provided on a top of said alignment element as viewed in said measuring direction.

13. The device of claim 7, wherein said alignment element is guided without play transversely with respect to said measuring direction on said scale element, and is immovably clamped on said scale element.

14. The device of claim 7, further comprising:

a spacer element, by which said scale element is maintained at a distance from a surface of said first body and which is displaceable in said measuring direction with respect to said scale element.

15. The device of claim 14, wherein said spacer has a thickness of approximately 1 mm as measured between said scale element and an underside of said spacer.

16. The device of claim 14, wherein said spacer element is integrated into said alignment element.

* * * * *